US012703529B2

(12) United States Patent
Bonnain et al.

(10) Patent No.: US 12,703,529 B2
(45) Date of Patent: Aug. 11, 2026

(54) ORIENTATION MODULE

(71) Applicant: WestRock Packaging Systems, LLC, Atlanta, GA (US)

(72) Inventors: Jean-Christophe Bonnain, Chateauroux (FR); Frederic Limousin, Le Poinconnet (FR); Fabrice Avril, Chateauroux (FR); Amelie Strohm-Volondat, Chateauroux (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 143 days.

(21) Appl. No.: 18/895,053

(22) Filed: Sep. 24, 2024

(65) Prior Publication Data

US 2025/0011022 A1 Jan. 9, 2025

Related U.S. Application Data

(63) Continuation of application No. 18/112,274, filed on Feb. 21, 2023, now Pat. No. 12,097,985, which is a continuation of application No. 17/385,646, filed on Jul. 26, 2021, now Pat. No. 11,584,557.

(60) Provisional application No. 63/056,260, filed on Jul. 24, 2020.

(51) Int. Cl.

| | |
|---|---|
| ***B65B 35/58*** | (2006.01) |
| ***B65B 35/36*** | (2006.01) |
| ***B65B 57/10*** | (2006.01) |
| ***B65G 47/24*** | (2006.01) |
| ***B65G 47/248*** | (2006.01) |

(52) U.S. Cl.

CPC .............. *B65B 35/58* (2013.01); *B65B 35/36* (2013.01); *B65B 57/10* (2013.01); *B65G 47/248* (2013.01)

(58) Field of Classification Search

CPC ......... B65B 35/58; B65B 35/36; B65B 57/10; B65G 47/24; B65G 47/248

See application file for complete search history.

(56) References Cited

U.S. PATENT DOCUMENTS

| | | | |
|---|---|---|---|
| 3,848,394 | A | 11/1974 | Heisler |
| 4,078,357 | A | 3/1978 | Ida |
| 4,362,594 | A | 12/1982 | Nagano et al. |

(Continued)

FOREIGN PATENT DOCUMENTS

| | | | |
|---|---|---|---|
| DE | 102018109770 | A1 | 10/2019 |
| FR | 2708759 | | 2/1995 |

(Continued)

OTHER PUBLICATIONS

US 2016/0362211 A1, Kruglick, Dec. 15 (Year: 2016).*
US 2020/0377307 A1, Kinoshita et al., Dec. 3 (Year: 2020).*
JP Office Action dated Oct. 7, 2025, 3 pages.

*Primary Examiner* — Douglas A Hess
(74) *Attorney, Agent, or Firm* — Brian J. Goldberg; Rohini K. Garg; Tsugihiko Suzuki

(57) ABSTRACT

An orientation module including a base configured to support at least one container, a camera positioned to scan the at least one container, a processor operatively connected to the camera configured to analyze an initial orientation of the container and determine a secondary orientation of the container, and a turning member positioned above the base configured to turn the corresponding container according to a command from the processor to rotate the container to the secondary orientation.

14 Claims, 20 Drawing Sheets

(56) References Cited

U.S. PATENT DOCUMENTS

| | | | | |
|---|---|---|---|---|
| 4,428,474 | A | 1/1984 | Gau et al. | |
| 5,058,724 | A | 10/1991 | Hinton | |
| 5,755,335 | A | 5/1998 | Michelotti et al. | |
| 6,398,006 | B1 | 6/2002 | Dault | |
| 6,793,755 | B2 | 9/2004 | Schaupp et al. | |
| 7,198,070 | B1 | 4/2007 | Hansen et al. | |
| 8,104,376 | B2 | 1/2012 | Eder | |
| 8,903,540 | B2 | 12/2014 | Stork et al. | |
| 8,994,959 | B2 | 3/2015 | Beckhaus | |
| 9,573,711 | B2 | 2/2017 | Nitsch et al. | |
| 10,035,620 | B2 | 7/2018 | Pau et al. | |
| 10,183,772 | B2 | 1/2019 | Marcantoni | |
| 11,180,323 | B2 | 11/2021 | Middelberg | |
| 11,584,557 | B2 * | 2/2023 | Bonnain | B65G 47/846 |
| 11,866,270 | B2 * | 1/2024 | Bonnain | B65G 47/36 |
| 12,097,985 | B2 * | 9/2024 | Bonnain | B65B 35/58 |
| 12,304,747 | B2 * | 5/2025 | Bonnain | B65G 47/847 |
| 2004/0003575 | A1 | 1/2004 | Arends et al. | |
| 2011/0108389 | A1 | 5/2011 | Bonnain | |
| 2015/0191263 | A1 | 7/2015 | Nitsch et al. | |
| 2016/0207719 | A1 | 7/2016 | Josefowitz | |
| 2018/0170596 | A1 | 6/2018 | Marcantoni | |

FOREIGN PATENT DOCUMENTS

| | | | |
|---|---|---|---|
| JP | 2003025266 | A | 1/2003 |
| JP | 2015531729 | A | 11/2015 |
| JP | 2017523100 | A | 8/2017 |
| KR | 20100011024 | U | 11/2010 |

* cited by examiner 806
804
840
848
850
826
841b
841a
S
824
834b
828b
822
C2
101
834a
828a

ORIENTATION MODULE

BACKGROUND

Technological Field

The present disclosure relates to a container packing and orienting system, and more particularly to systems for maintaining an orientation of a container throughout a packaging process.

Description of Related Art

In the field of packaging it is often required to provide consumers with a package comprising multiple primary produce containers. Such multi-packs are desirable for shipping and distribution and for display of promotional information.

It is desirable to provide a compact packaging machine, one with a reduced footprint, i.e. one that occupies less area or space within a production facility, and one that is able to display the promotional or product information properly. It is an object of the disclosure to present a system capable of organizing products into packages and orienting them in the desired direction. The conventional methods and systems have generally been considered satisfactory for their intended purpose. However, there is still a need in the art for a system having improved orienting capabilities while maintaining a small footprint. The present disclosure may provide a solution for at least one of these remaining challenges.

SUMMARY OF THE INVENTION

An orientation module includes a base configured to support at least one container, a camera positioned to scan the at least one container, a processor operatively connected to the camera configured to analyze an initial orientation of the container and determine a secondary orientation of the container, and a turning member positioned above the base to turn the corresponding container according to a command from the processor to rotate the container to the secondary orientation. The at least one container can be a stream of containers.

The base can include a surface configured to receive a corresponding container and rotate the container. Each surface can include a rotatable disk. The rotatable disk can include an upper surface flush with an upper surface of the base.

The orientation module can include a star wheel positioned above the base configured to guide the container. The star wheel can be interchangeable with a replacement star wheel configured to guide a replacement container having a diameter different from a diameter of the container.

The turning member can include a disc configured to contact a top surface of the container when the turning member actuates from a retracted position to a deployed position. The disc can be deformable. The retracted position can be above the deployed position with respect to gravity.

The turning member can include a corresponding motor configured to rotate the turning member independently. The camera can be stationary with respect to the base. The base and the turning member can be rotatably positioned with respect to the camera. The base can be vertically stationary.

A conveyor system for orienting a container includes a first conveyor module, an orientation module configured to receive a stream of containers from the first conveyor module and orient at least one of the containers in a respective desired direction, wherein the orientation module includes a base, a camera, and at least one turning member moveably positioned above the base configured to turn a corresponding container, and a grouping module configured to receive containers from the orientation module. At least a portion of the base can be positioned adjacent to a rounded portion of the grouping module.

A method of orienting a container includes receiving a stream of containers, scanning at least one container of the stream of containers, calculating an orientation adjustment of the container, and turning the container to effectuate the adjustment. Multiple containers within the stream of containers can be scanned by the camera. Each adjustment can require turning in the same direction. The adjustment of the container can be effected by contacting a top surface of the container with a turning member, and can be further effected by rotating a surface on which the container is standing. The method can include forming an assembly graphic formed by graphics on adjacent containers. The assembly graphic can be repeated throughout the stream of containers. Turning can include maintaining a constant vertical level of each of the containers.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
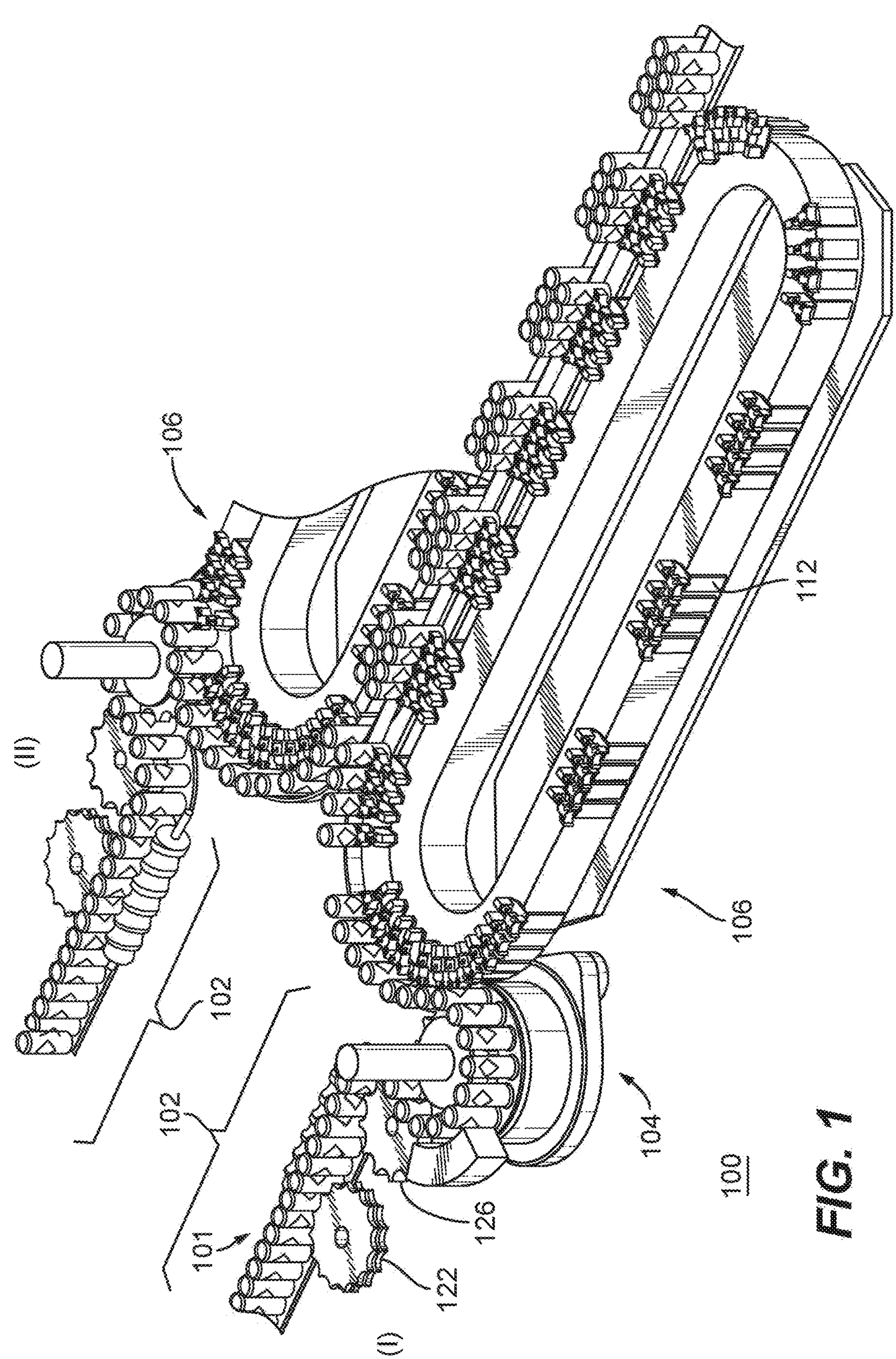
FIG. 1 is a perspective view of a system for packaging containers.

Reference will now be made to the drawings wherein like reference numerals identify similar structural features or aspects of the subject invention. For purposes of explanation and illustration, and not limitation, a partial view of an exemplary embodiment of a system for creating packages in accordance with the disclosure is shown in FIG. 1 and is designated generally by reference character 100. Other embodiments of the system and aspects thereof, are provided in FIGS. 2-17, as will be described. The methods and systems of the invention can be used to meter a stream of containers, orient each container in desired orientation and maintain that orientation throughout a packaging process.

FIG. 1 shows a system 100 capable of receiving a stream of containers 101, scanning containers 101, the orienting them into a desired direction, and organizing them into groups while maintaining the desired orientation for packaging them into packs or packages. The system 100 shown in FIG. 1 includes two mirrored sets (I and II) of modules. Each set has the same three types of modules. Each of the modules, their capabilities, details, and possible configurations will be described in detail below. Each set (I/II) includes the following modules: a conveying module 102, an orienting module 104, and a grouping module 106, one of which is labeled in FIG. 1 for set I, the other of which is only partially shown in FIG. 1 for set II. The conveying modules 102 are each configured for receiving the stream of containers 101 and providing an initial spacing and metering the containers 101. Each orienting module 104 is configured for scanning and orienting the containers as necessary. The grouping modules 106 are each configured for organizing the oriented containers 101 into packs and groups. Although two sets I and II are shown in FIG. 1, each module in the subsequent figures and in the description below will be discussed as part of an individual set, not including its mirrored counterpart.

The system 100 offers multiple benefits over previous conveyor systems in a world that demands faster and more efficient production techniques. The following is a non-exhaustive list of the benefits offered by system 100: it allows users a faster and more convenient changeover between differing container sizes and types, the system allows for faster, more reliable, and more effective methods of packaging containers into groups, all while taking up less factory floor space.

Figure 2:
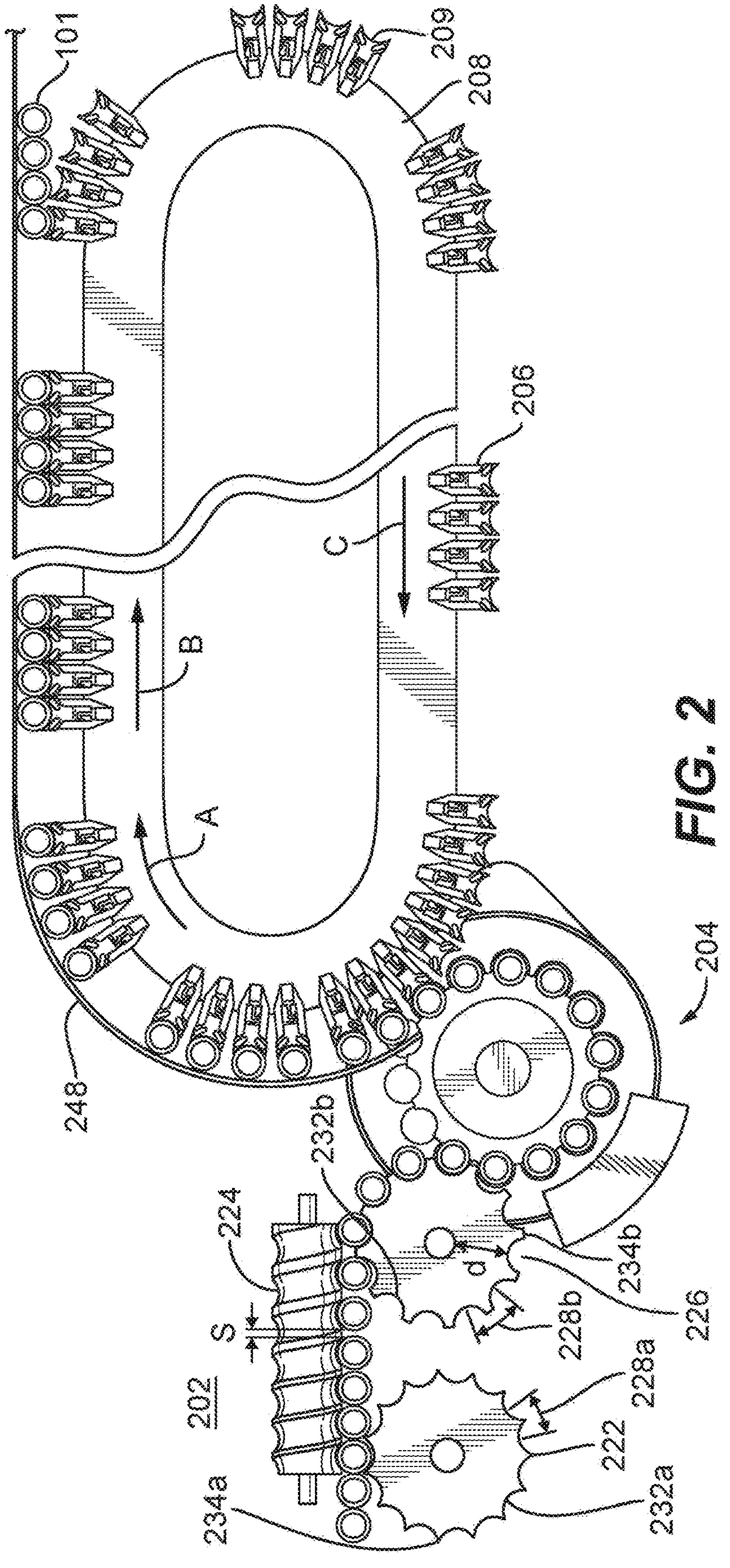
FIG. 2 is a top view of the system of FIG. 1, showing a layout of one of the sets of modules.

FIG. 2 shows an embodiment of one of the sets of modules, i.e. set I, of the system 100. Set I includes a conveying module 202, an orienting module 204, and grouping module 206 consisting of a single oval track 208 wherein grippers 209 attached to lugs 211 that move the containers 101 along the track 208. Each lug 211 is driven about the track 208 by its own respective linear servo drive 112 (shown in FIG. 1). This allows for programming a of a specific speed profile for each lug 211 or group of lugs, which can move separately from one another to form groups of containers 101. Another added benefit of the horizontal oval configuration of the track 208 is when power to the system is lost, the lugs 211 stay in place and are not moved by gravity and do not fall from the track 208.

Figure 3:
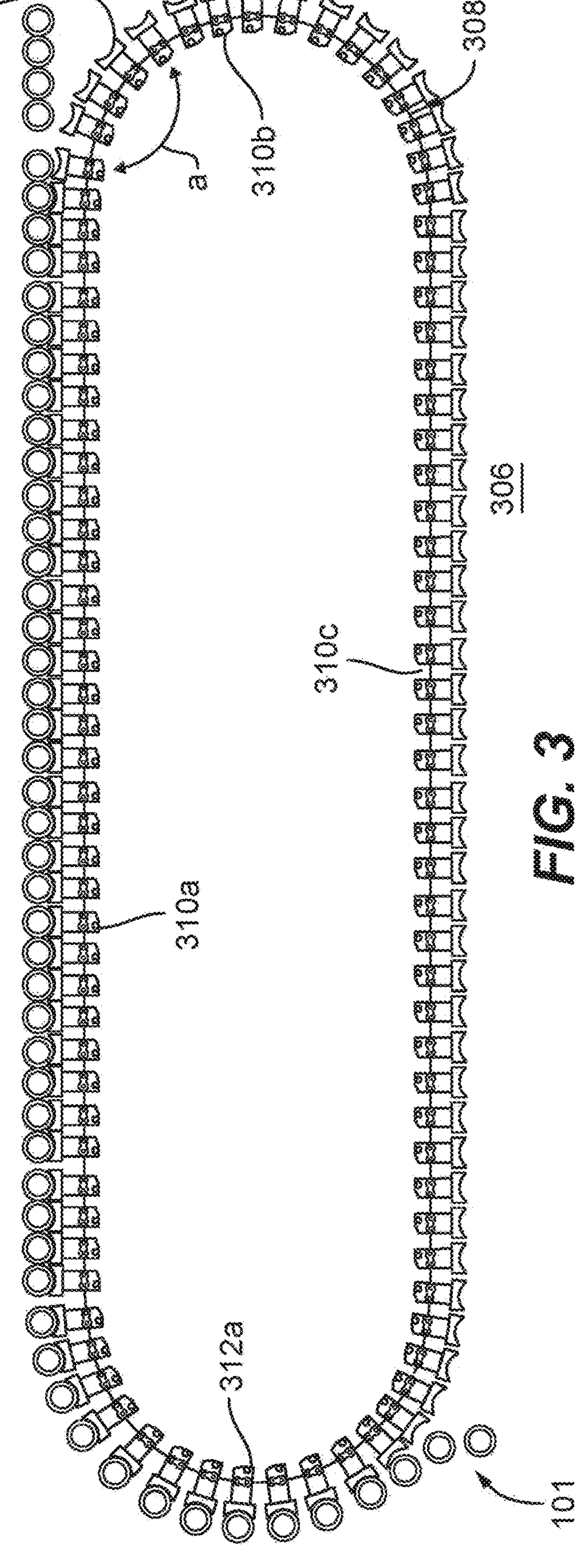
FIGS. 3-6 are top views of the system of FIG. 1, showing various embodiments of the grouping modules of FIG. 1.
Figure 4:
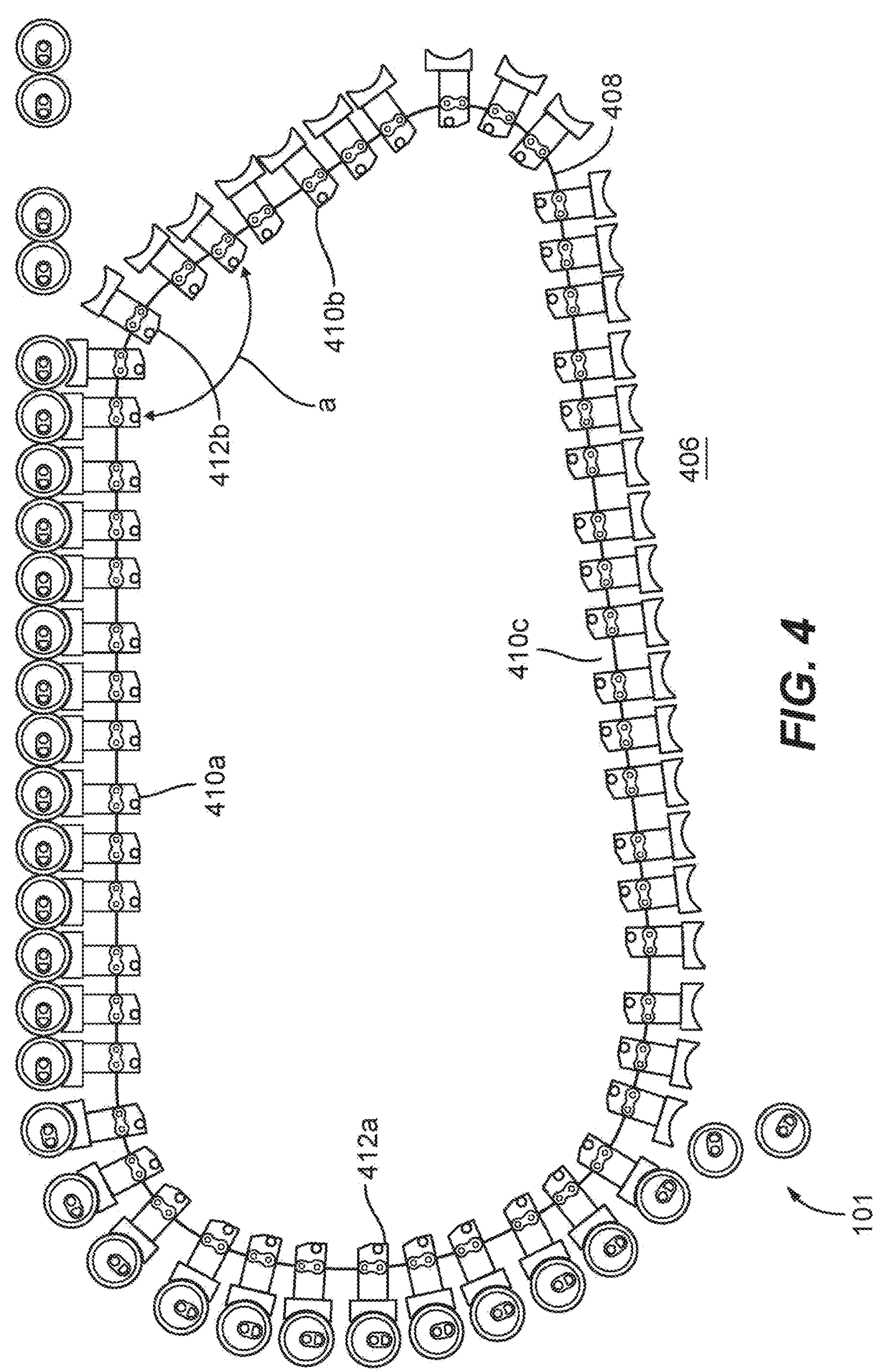
Figure 5:
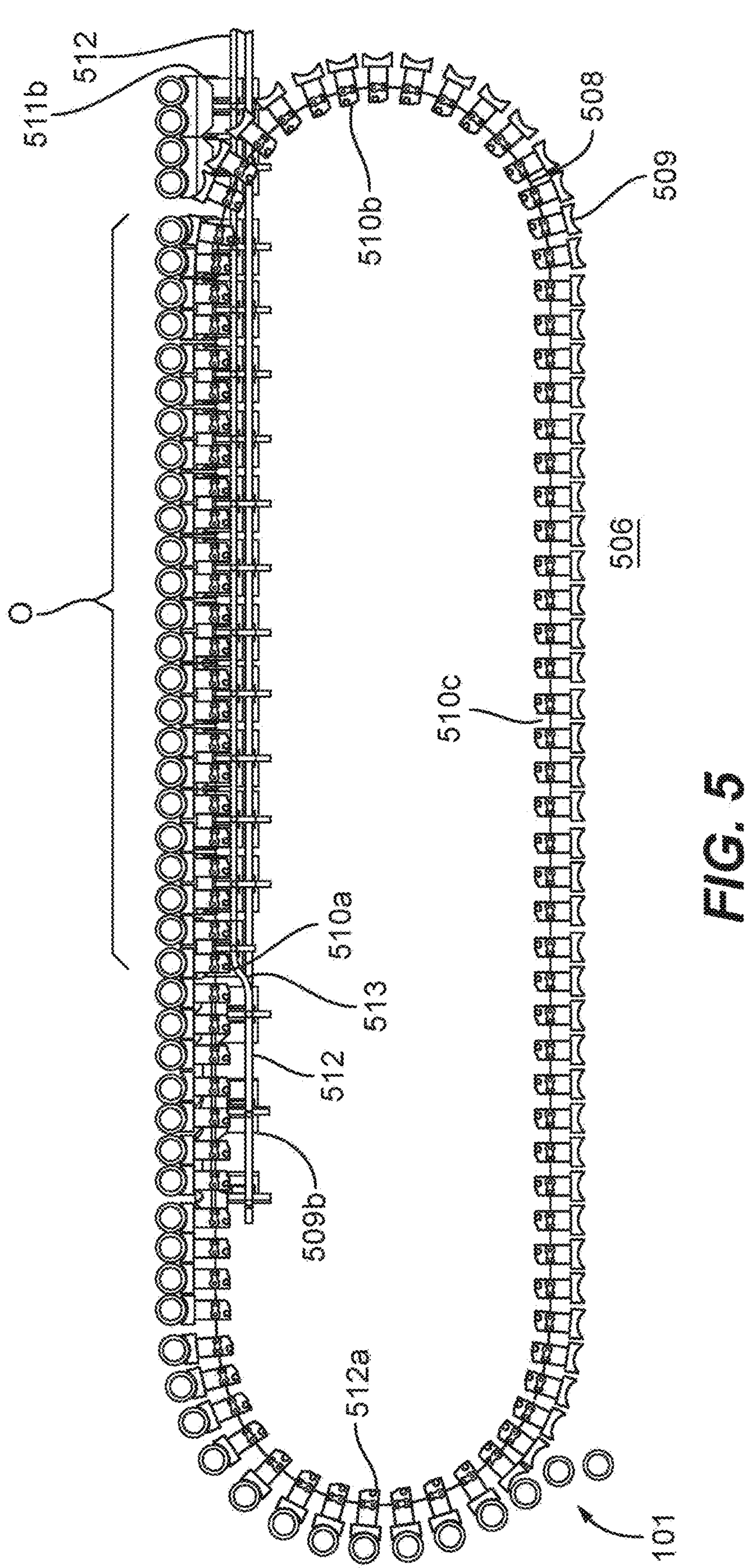
Figure 6:
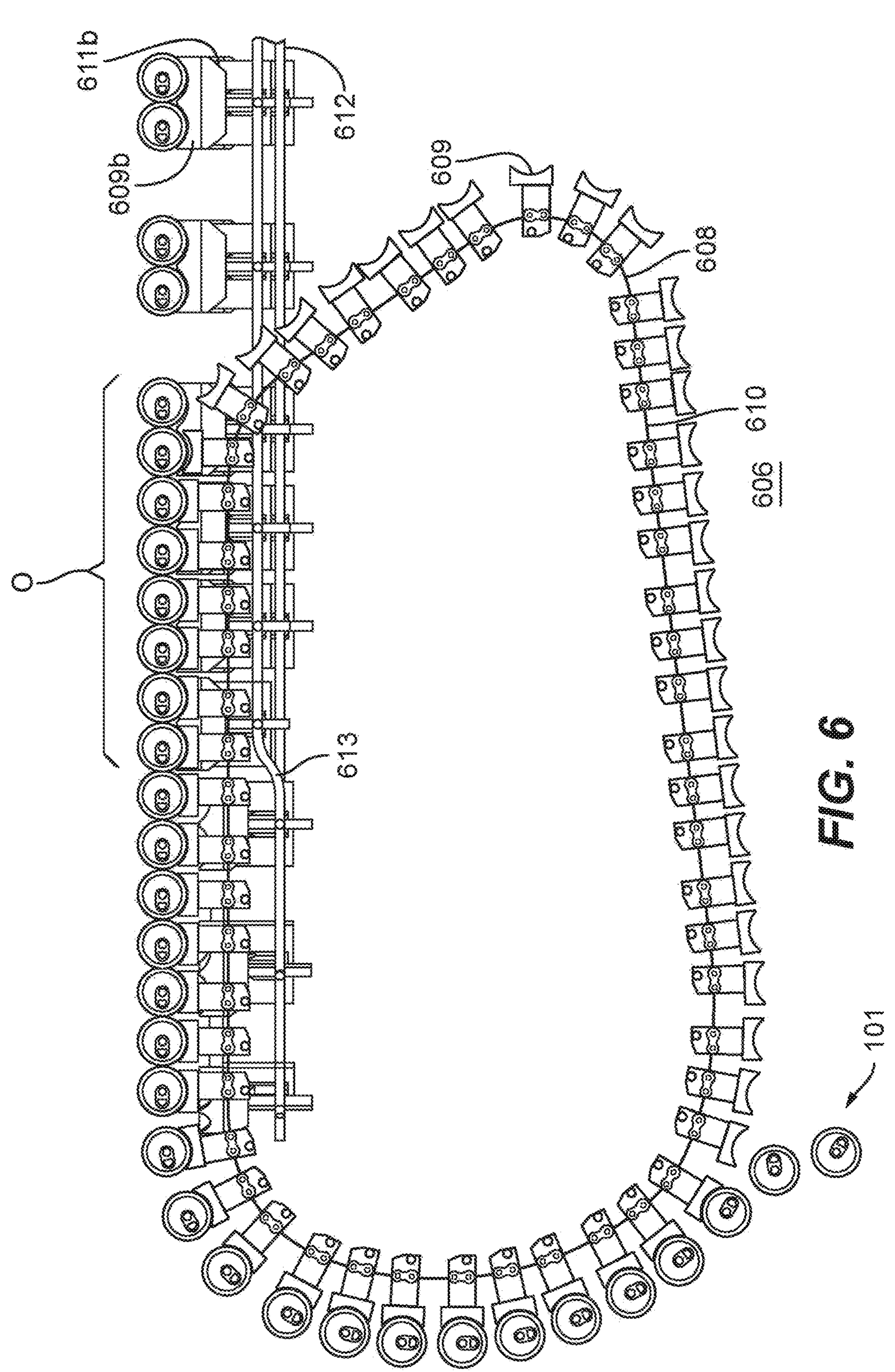

FIG. 3 shows an embodiment including a grouping module 306 having a single oval track 308 wherein grippers 309 that move the containers 101 along the track 308 are each moved about the track 308 by a chain 310. FIG. 4 shows of an embodiment grouping module 406 including a single track 408 including at least three straight sections 410*a*, 410*b*, and 410*c*, and at least two curved sections 412*a* and 412*b*. FIG. 5 shows an embodiment of a grouping module 506 including an oval track 508 where the grippers 509 that move the containers 101 along the track 508 are each moved by a chain 510 and second track 512 is disposed in a vertical plane that takes the container hand-off from the first track 508. The track 508 including at least two straight sections 510*a* and 510*b* and two curved sections 512*a* and 512*b* The second track uses a second set of grippers 509*b* and second set of lugs 511*b* to transport the containers after receiving them from the first track. FIG. 6 a grouping module 606 consisting of an oblong track 608, as with the embodiment of FIG. 4, where grippers 609 that move the containers 101 along the track 608 are each moved about the track by a chain 610 and second track 612 is also disposed in a vertical plane that receives container 101 from the first track 608. Each of these embodiments include unique benefits as will be described below.

Each conveying module 102, 202, 302, 402, 502, 602, mentioned above, receives a stream of containers 101. Tracks 208, 308, 408, 508, 608 can all be used with a conveying module 102 as shown in FIG. 1. At this point, the stream of containers 101 typically does not have spacing between each container 101. As the stream of containers 101 reaches the conveying module 102 the stream meets a first star-wheel 122, which helps straighten the stream 101 and feed the containers of the stream to a metering screw 124. The metering screw 124 creates a pitch or predetermined spacing(s) between each of the containers. The metering screw 124 then feeds the spaced stream of containers 101 to a second star-wheel 126. The second star-wheel 126 has a different shape than the first star-wheel 122. Namely the second star-wheel 126 has a larger spacing between the centers 228*a* of each adjacent divot 232, 226 wheel also includes a wider tooth 234*b* than that of the first star-wheel 222. However, the size of the divot 232 of each star-wheel remains the same, in order to accept and handle a container 101 of the same diameter. It is also considered that star-wheels with non-circular divots can be used in order to convey non-circular containers such as juice boxes, milk cartons, or motor oil. The second star-wheel 226 typically has a smaller diameter and spins faster than the first star-wheel 222. This combination of star-wheels 222, 226, taken alone and in combination with others, allows for a more compact footprint of the conveying module 202 and of the overall system.

Figure 7:
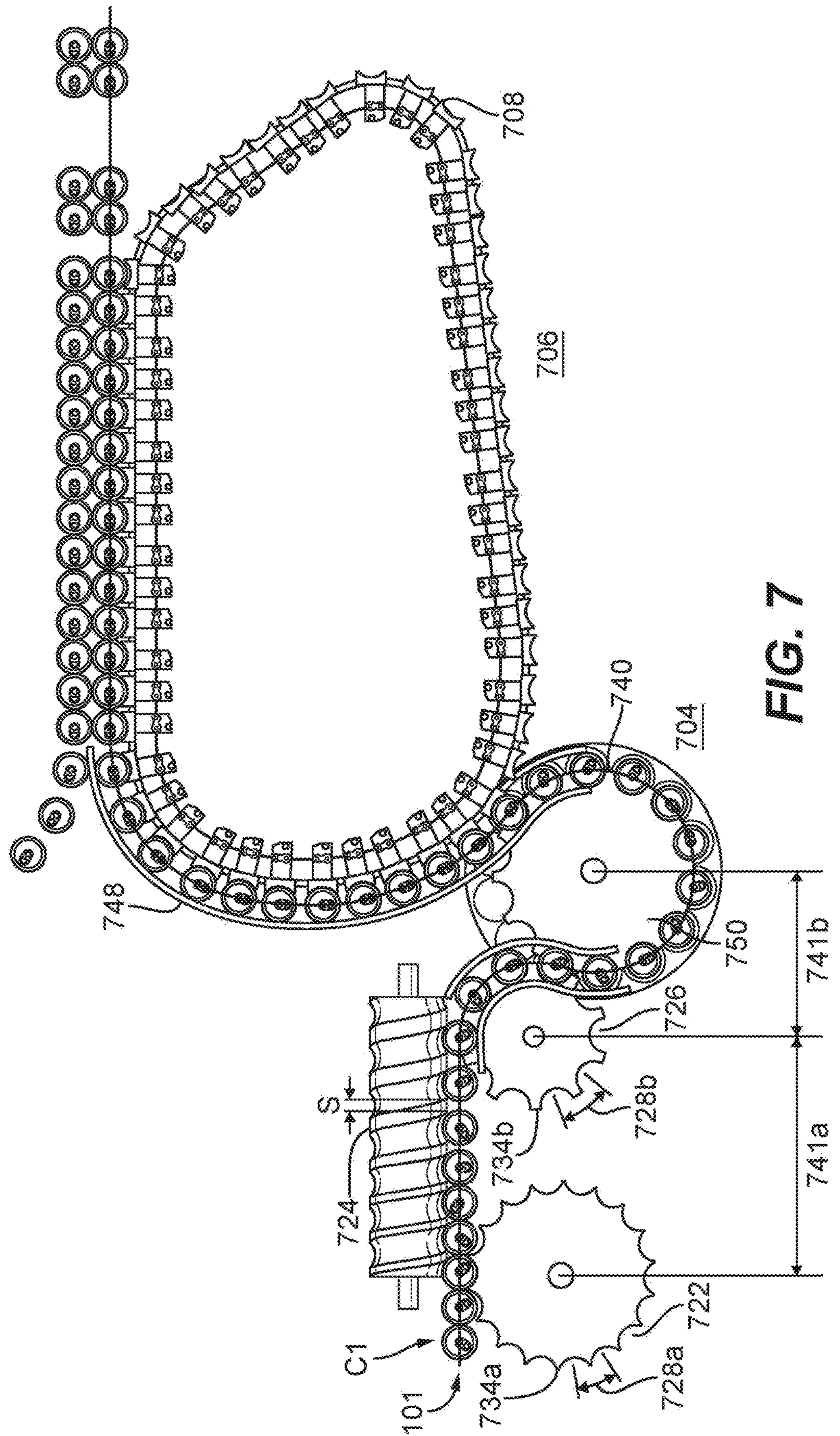
FIGS. 7-9*c* are top views of the conveyor modules of the system of FIG. 1, showing equivalent paths for containers of various sizes through the conveyor module and the orienting module.
Figure 7A:
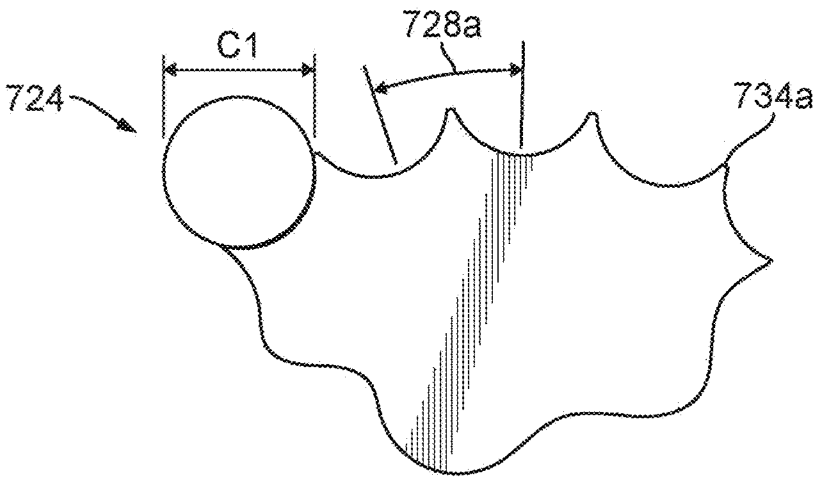
Figure 7B:
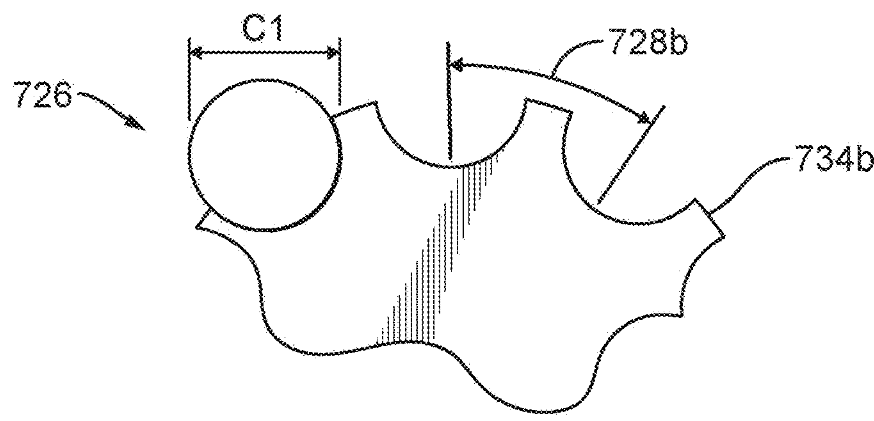
Figure 7C:
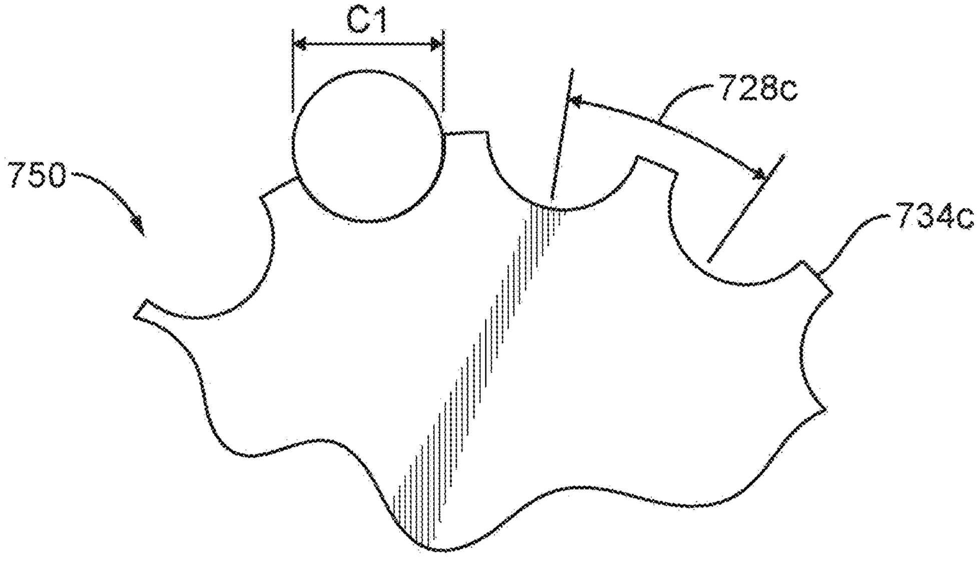
Figure 8:
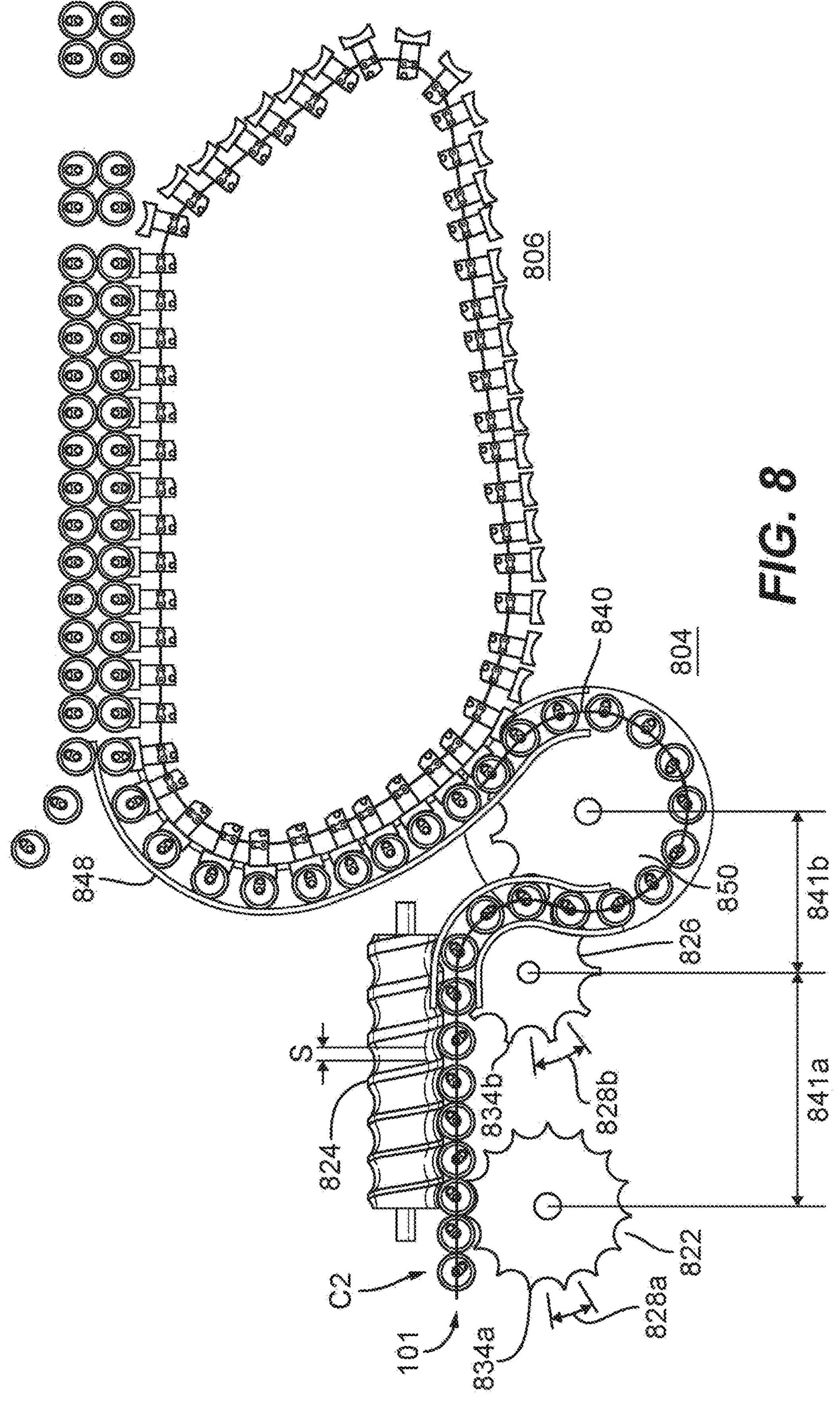
Figure 8A:
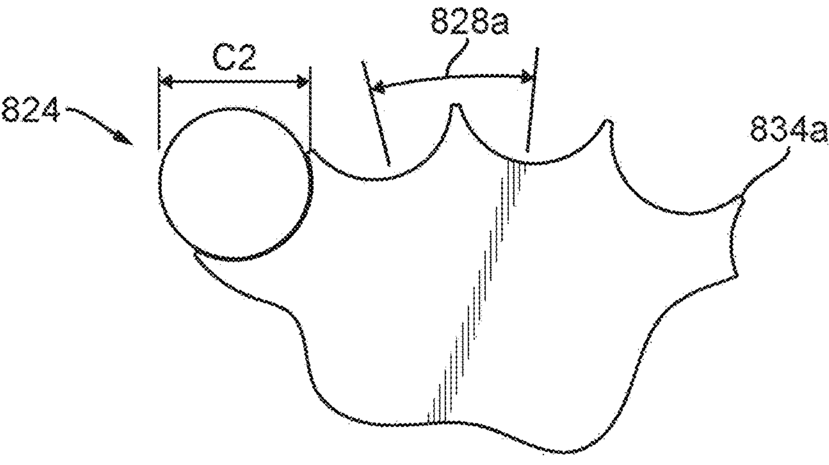
Figure 8B:
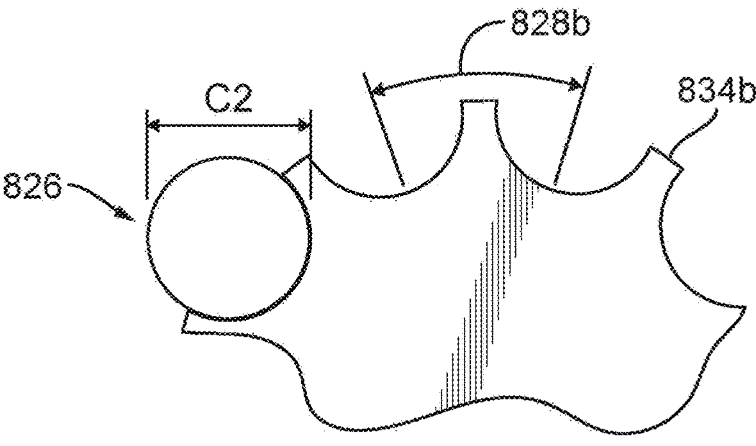
Figure 8C:
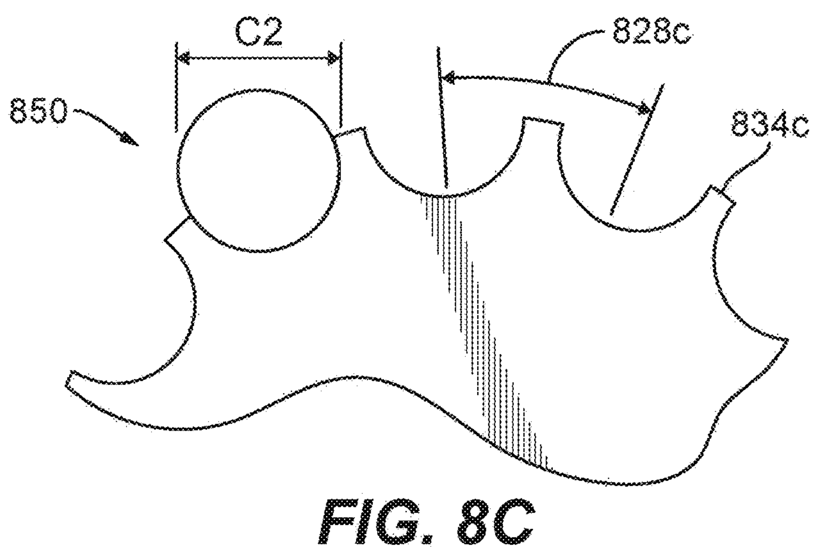
Figure 9:
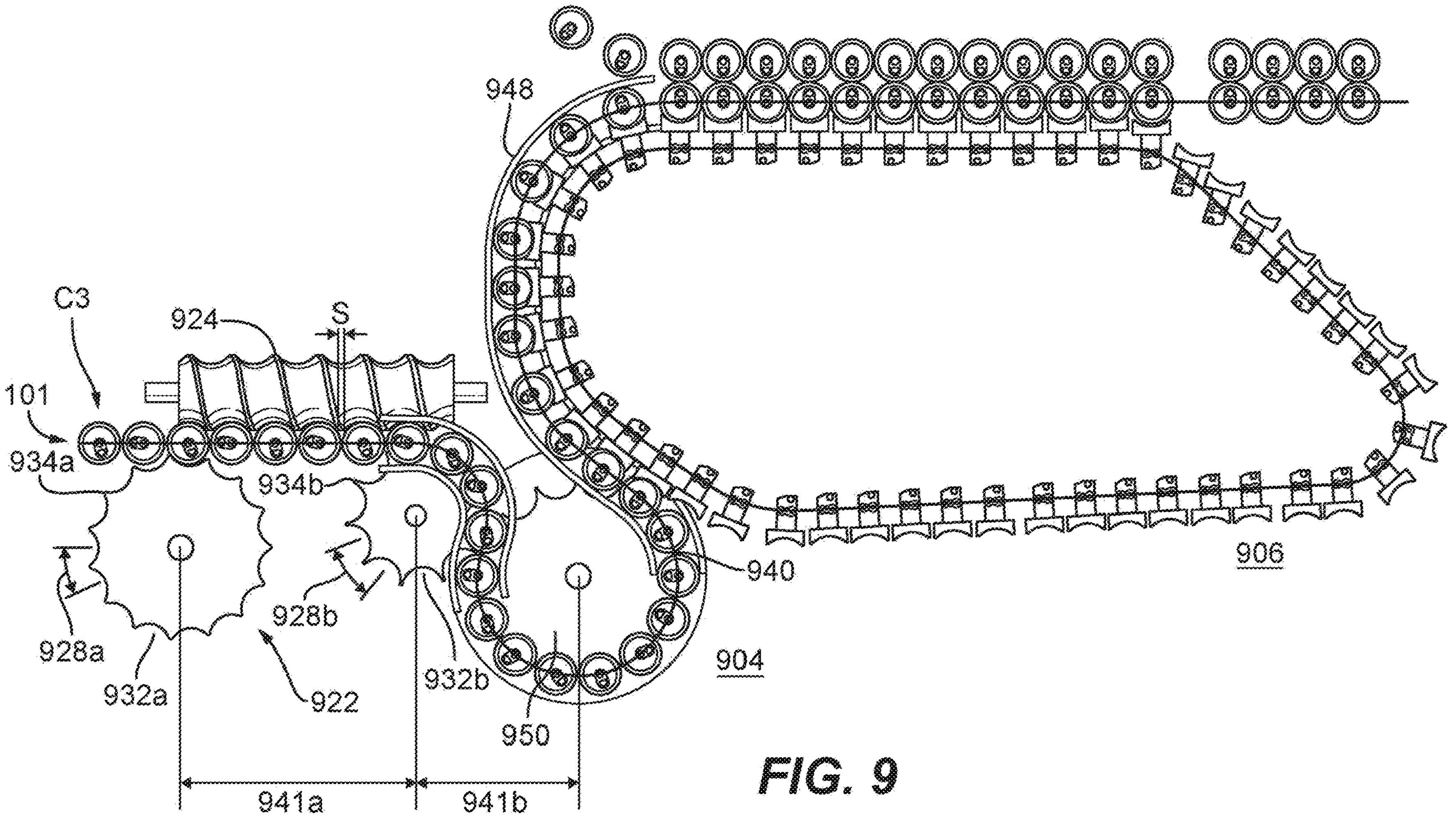
Figure 9A:
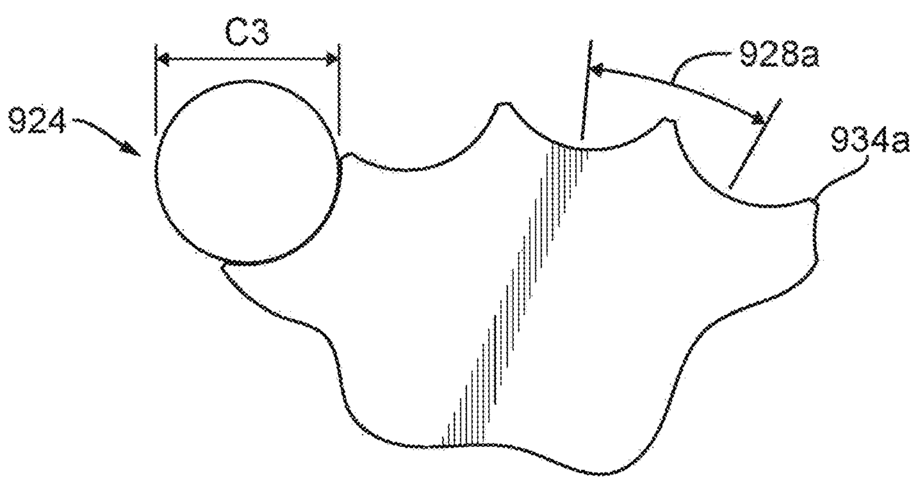
Figure 9B:
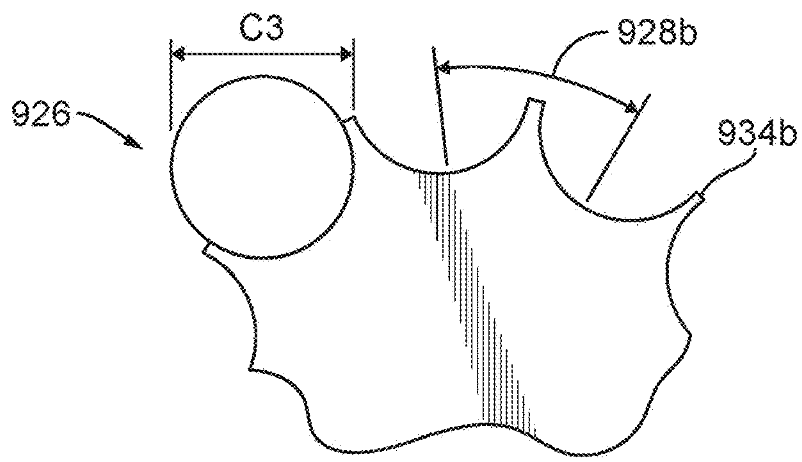
Figure 9C:
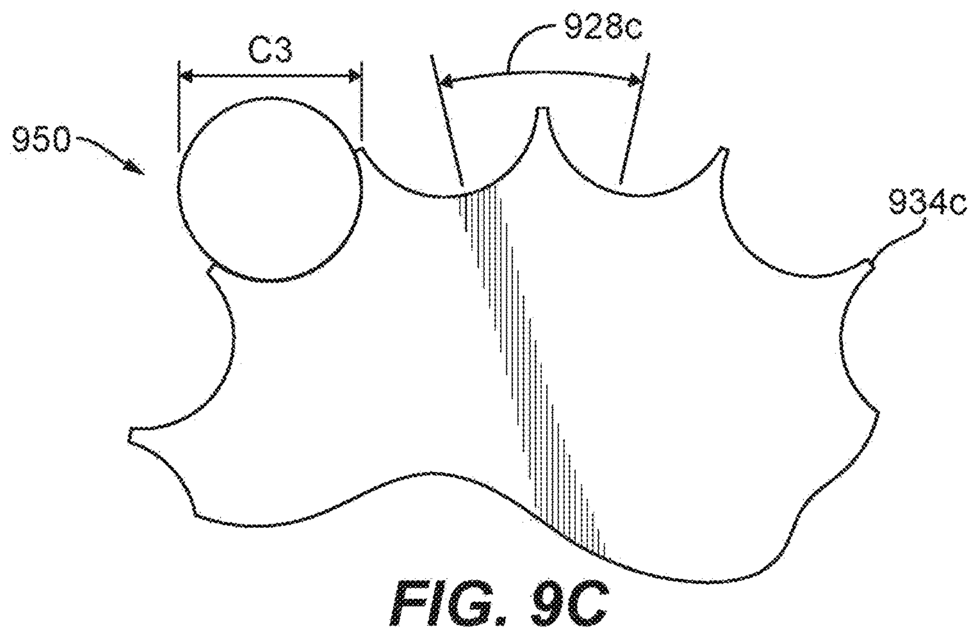

As seen in FIGS. 7-9, the stream of containers 101 forms a path 740 for the stream of containers 101 from the first star-wheel 722 to the first track 708 of the grouping module 706. The path 740 is defined by travel path of the center of each container 101. The path 740 stays substantially the same even if the diameter of the containers 101 changes, e.g. after switching out star wheels to change container size as described above. When comparing FIGS. 7, 8, and 9, the containers 101 of FIG. 7 are smaller than the containers 101 of FIGS. 8 and 9. However, the path 740 of the centers of the containers 101 substantially the same starting from the first star-wheel 722 of the conveying module 702 through the star-wheel 750 of the orienting module 704. The path 740 is maintained by swapping-out the first star-wheel 722, the metering screw 724, the second star-wheel 726 and the star-wheel of the orienting module 750 for a corresponding one of these parts. Each of these parts 722, 724, 726 are swapped out for corresponding parts having the same amount of teeth 734 and divots 732, but a deeper and wider divot 732, and thinner teeth 734 (for larger containers 101) or a thicker tooth 734 and narrower divot 732 (for smaller containers 101). FIG. 7*a*-7*c* show the details of each of the star wheels, which can be interchanged as needed with the star wheels shown in FIGS. 8*a*-8*c*, and 9*a*-9*c*. The axis on which each of the components 722, 724, 726 rotates stays the same after changing star wheels 722, 726. Further, the distances 741*a* and 741*b* stay the same between FIGS. 8 and 9, where they are labeled 841*a* and 841*b* and 941*a* and 941*b*. The star-wheels 822, 826 are left on the same vertical axels and the metering screw 824 is left on the same horizontal axel. This allows a system 100 to be easily changed for an infeed container 101 with a different diameter, e.g., different can diameter.

As seen in FIGS. 7-9, the path of the containers 101 after the orienting module 704/805/904 is different from FIG. 7 to FIG. 8 to FIG. 9. In previously used systems, the placement of each module differs from FIG. 7 to FIG. 8 to FIG. 9, which in turn required more movement of modules and lengthier changeover times between different sized/shaped containers. This system saves time in changeovers, e.g. for different can sizes, and reduces the possibility of errors in those changeovers because less parts have to be moved to accommodate differing parts.

Figure 10:
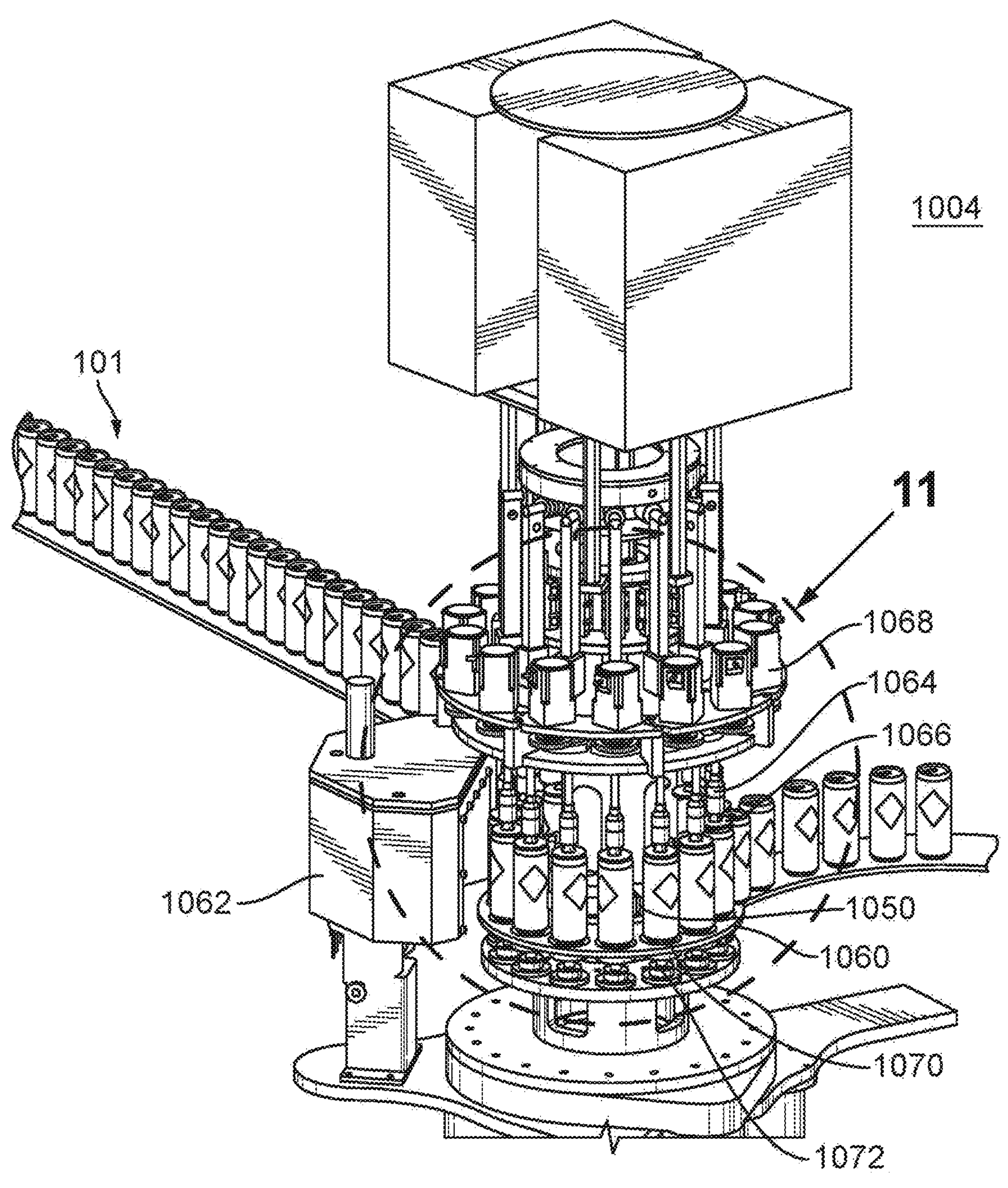
FIG. 10 is a perspective view of the orienting module of the system of FIG. 1.

As each container 101 passes the second star-wheel 726, the container 101 is fed to the orienting module 704. FIG. 10 shows a perspective view of the orienting module 1004. The orienting module includes a base 1060, which supports the incoming containers 101, a camera 1062 located to the side of the base 1060, scanning the containers container 101 and a plurality of turning members 1064 moveably positioned above the base 1060 that contact and turn the containers 101. A processor (not shown) is operatively connected to the camera 1062. The processor analyzes the initial orientation of the containers 101, i.e. before they are properly oriented. In some embodiments it is considered that the camera 1062 is required to scan every single container, and in other embodiments the camera 1062 is only required to scan every second, or third or fourth container. Depending on downstream packaging steps, and client specifications, each and every container 101 might be required to face the same direction. After the incoming orientation of the containers 101 has been analyzed, the processor computes a necessary correction. Each container 101 needs a different correction from the other containers 101 because the incoming orientation could be different, and/or because the final orientation needs to be different for each container 101.

Multiple containers 101 can be used to create a single large graphic when placed adjacent to each other within the package. Adjacent containers within one package can have a different orientation showing a different graphic or portion of a graphic to a customer. Alternatively, adjacent containers can form one large graphic seen across multiple containers. For instance the graphic "CANS" can consist of four containers. Each container can be showing either a 'C', an 'A', an 'N' or an 'S'.

The orientation module star-wheel 1050 is positioned above the rotatable base 1060 to help secure the containers 101 as they rotate past the camera 1062. As the containers 101 move past the camera 1062 the orientation star wheel helps guide them, and provide further stability as they get oriented. The star-wheel 1050 of the orienting module 1004 has the same spacing between centers of adjacent divots 1032 as the second star-wheel 1026 of the conveying module 1002, as well as the same tooth 1034 thickness. It is important to maintain spacing between each container 101 so that the camera 1062 is able to properly identify the incoming orientation of each container 101. Without spacing between each container 101 adjacent containers 101 will be recognized as a single item by the camera, and will not be able to transmit required information to the processor.

Figure 11:
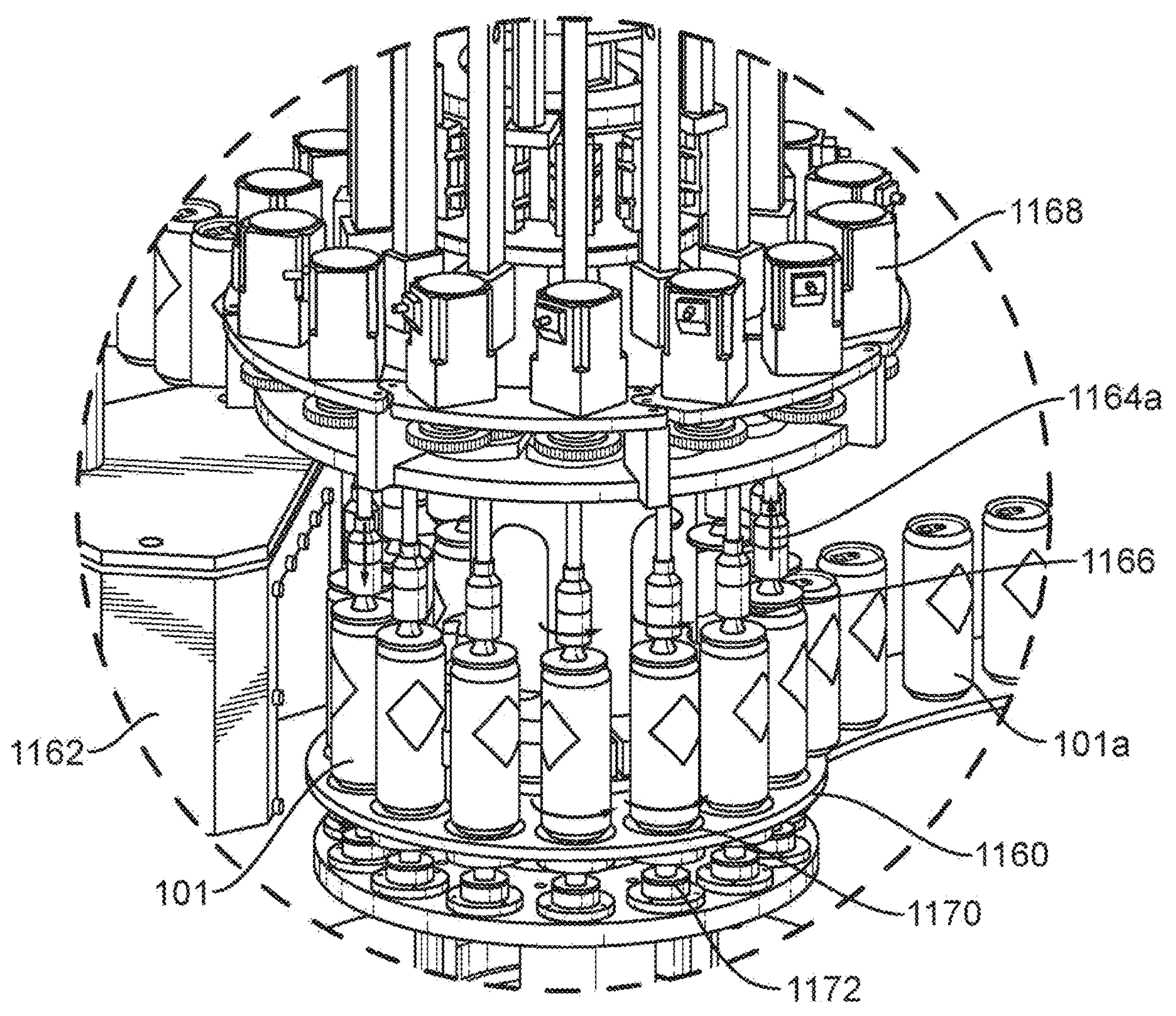
FIG. 11 is a perspective view of the orienting module of FIG. 10 showing motion of the containers.

FIG. 10 further shows the turning members 1064. Each turning member 1064 corresponds to one container 101. In order to turn each container 100, a turning member 1064 moves down in order to come into contact with the container 101. As the turning member 1064 moves down a disc 1066 located on the bottom of each turning member 1064 contacts a top of each container 101 when the turning member 1064 actuates from a retracted position to a deployed position. When the disc 1066 comes in contact with each container 101, each turning member 1064 rotates each container 101 a necessary amount to place the container 101 in the desired orientation. Further seen in FIG. 10, a plurality of surfaces 1070 located within the base 1060. Each of these surfaces 1070 corresponds to a turning member 1064 and to a container. The surfaces 1070 are also operatively connected to the processor and programmed to turn the same direction and the same amount as each of the turning members 1064. Thus the containers are turned evenly from the top and from the bottom, further ensuring stability during turning. The motor 1072 for each of these surfaces 1070 is located below the top surface of the base 1060. The particular orientation, with moving turning members 1064 above the containers and a vertically stationary surface 1070 below the containers allows for a smaller motor and smaller turning turret, since each container 101 does not need to be moved vertically. Once the containers 101 are properly oriented the containers 101 are moved to the grouping module 106. FIG. 11 shows a subsequent view of the orientation module of FIG. 10. In this view it is possible to appreciate the now oriented containers 101 which were previously oriented in different directions, as well as the now retracted turning members 1064, which were previously in contact with the tops of containers 101.

Figure 12:
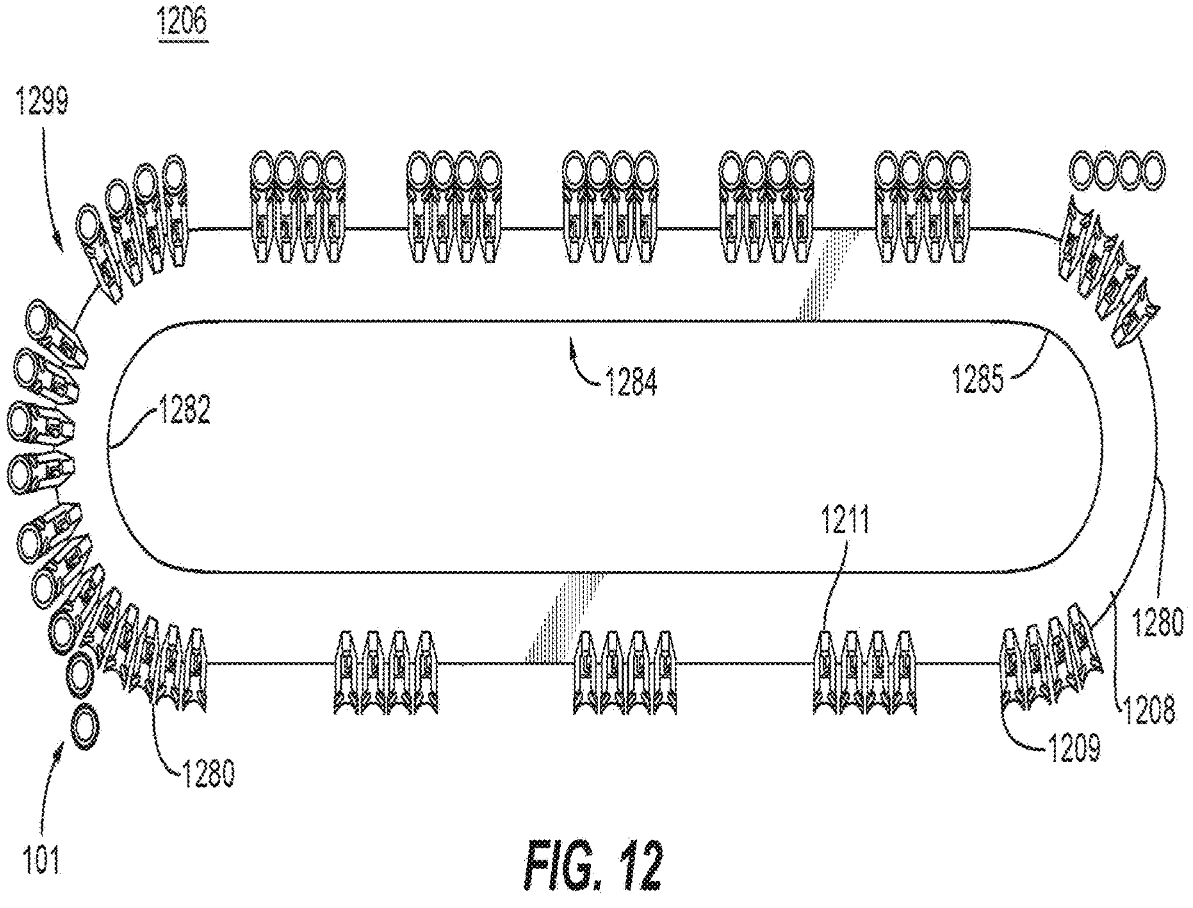
FIG. 12 is a top view of a grouping module of FIG. 1.

Referring now to FIG. 12, after containers 101 are oriented within the orienting module 1204, the stream of containers 101 are passed the grouping module 1206. The grouping module 1206 is responsible for grouping a necessary amount of containers 101 together, e.g. to begin forming packs of containers for subsequent packaging, while at the same time ensuring that the orientation of each individual container 101 remains unchanged from the orientation that was received from the orienting module 1204. As described above, a number of possibilities are presented for taking the stream of containers 101, and grouping them while ensuring that the desired orientation is maintained. FIG. 12 shows a first embodiment of the grouping module 1206 as was previously shown in FIG. 2. The grouping module 1206 includes a single oval track 1208 oriented in the horizontal plane. FIG. 12 further shows grippers 1209, which push the container 101 along the track attached to individual lugs 1211 where each lug is actuated by a linear servo drive 112 (shown in FIG. 1). The linear servo drive 112 (shown in FIG. 1) allows for programming individual or group lug 1211 speed profiles along the track 1208 for the lugs 1211 to follow.

As further seen in FIG. 12, as the containers 101 are circulated from the orienting module '04 to the grouping module '06, the lugs '11 move the attached grippers '10 in place to receive the containers 101. The lugs '11 are arranged prior to picking up the containers 101 in a queuing section '80, and accelerate around the first curved portion of the track once a desired group (in this case it is four containers 101) of containers 101 have been contacted in order to create a gap 1299 between this groups and the next group of containers 101, while maintaining the desired orientation of the containers 101 of the group of containers 101. Once the group has reached the straight section 1284, the group of containers 101 travel at a constant speed. At this point various packaging steps can take place. Each formed group can meet a group from the mirrored set II shown in in FIG. 1 to make a single group, e.g. an eight-pack, or four-pack.

Figure 13:
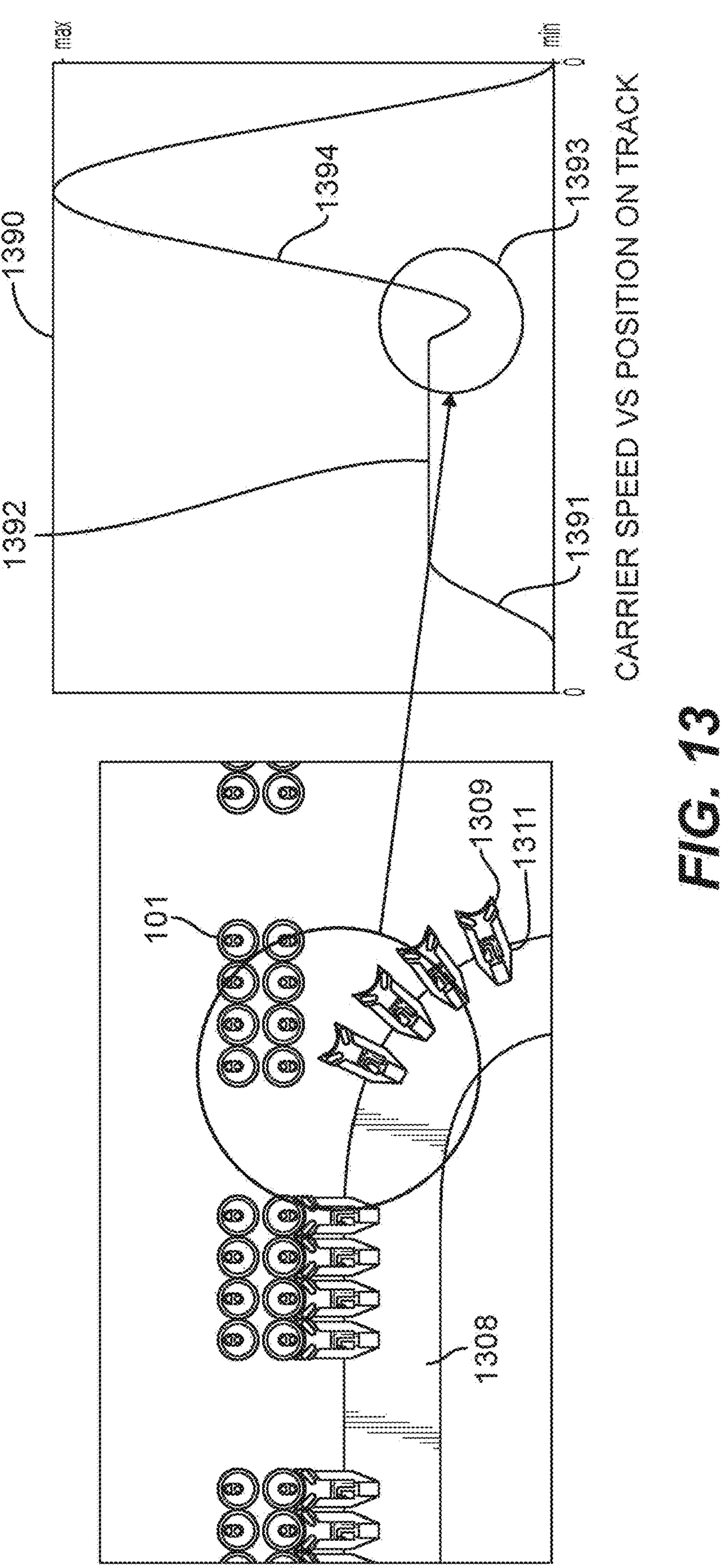
FIG. 13 shows a graphical interpretation of the velocity profile for lugs and grippers for a grouping module of FIG. 12.

With reference now to FIG. 13, as the lugs 1211 travel around the track, the lugs 1211 follow a programmed speed profile. This allows any plurality of lugs 1211 to be arranged together to form a desired group (two together, three together, etc.). After the lugs 1211 and grippers 1209 have reached the end of the first straight section 1284, the lugs 1211 peel away from the containers 101 at location 1285 in FIG. 12. One method the grippers 1209 and lugs 1211 peel away is by slowing down to allow the containers 101 to keep moving forward at the point where the straight portion turns to the second curved portion. This speed profile allows for the gripper and container 101 to gain separation from each other before the gripper changes directions, preventing the gripper from shifting, turning, or otherwise disturbing the containers 101. After the grippers 1209 are free of the containers 101, they accelerate around the rest of the second curved portion of the track and the second straight portion of the track to join the lugs 1211 in the queuing section.

FIG. 13 shows a graphical interpretation of the velocity profile for a lug and gripper as described above. The profile includes an acceleration 1391 immediately after contacting the last container 101 in the intended group of container 101 (the second in the package of two, and the third in a package of four). The acceleration 1391 allows the group to produce the gap 1299 from the next group. Afterwards containers 101 are moved along at a constant speed 1392, while packaging steps to the containers 101. In order to drop off the container 101 smoothly without disturbing them the lugs 1311 and gripper can be slowed down 1393, as the containers 101 are moved away by another conveyor or lug and carrier combination, as described above. After the containers 101 are dropped off the grippers 1309 the lugs 1311 and grippers 1309 accelerate 1394 to the highest velocity in order to return to the queuing section before picking up another container.

Figure 14:
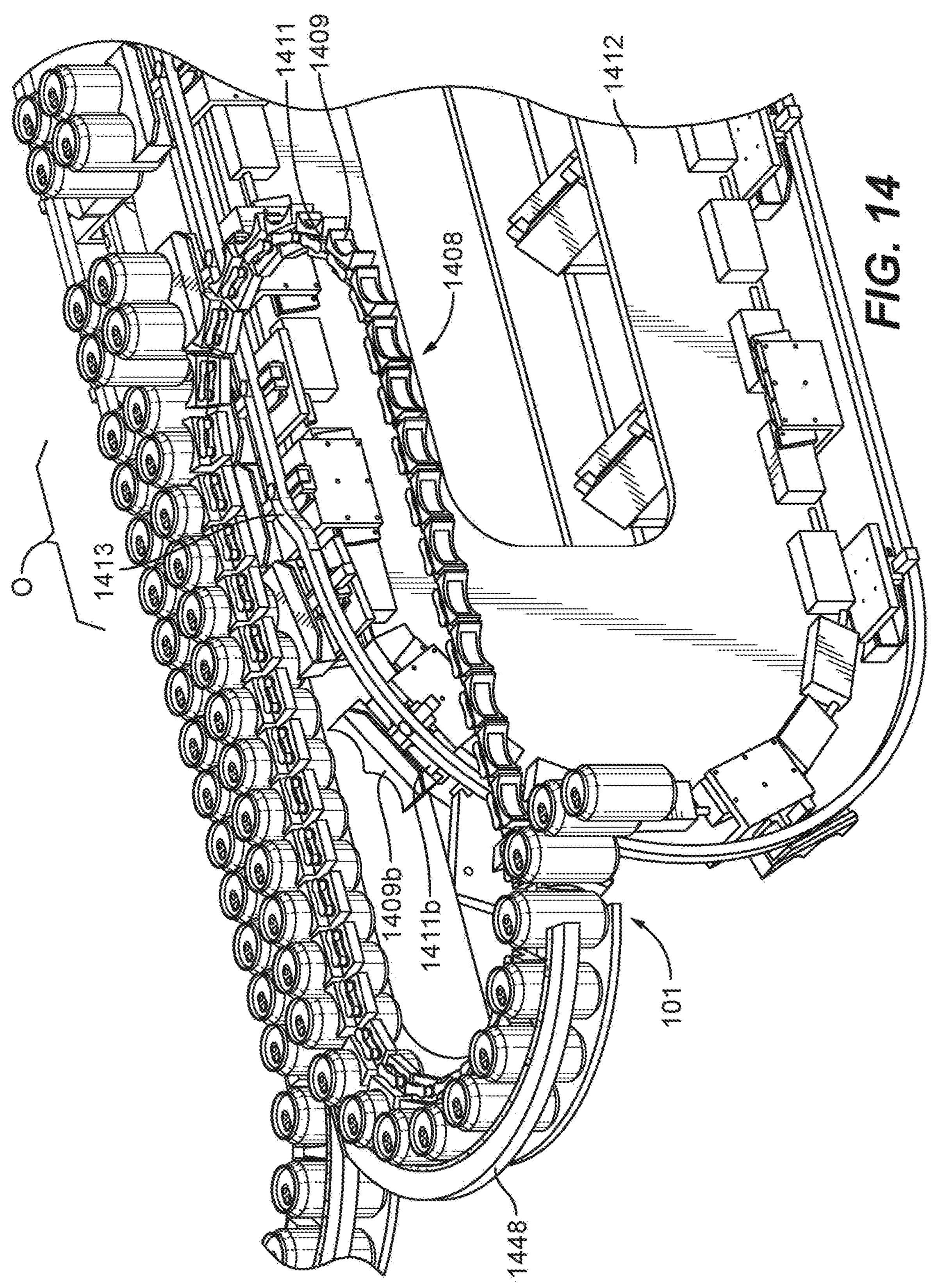
FIG. 14 is a perspective view of the system of FIG. 5, showing interaction of the second track with the first track.
Figure 15:
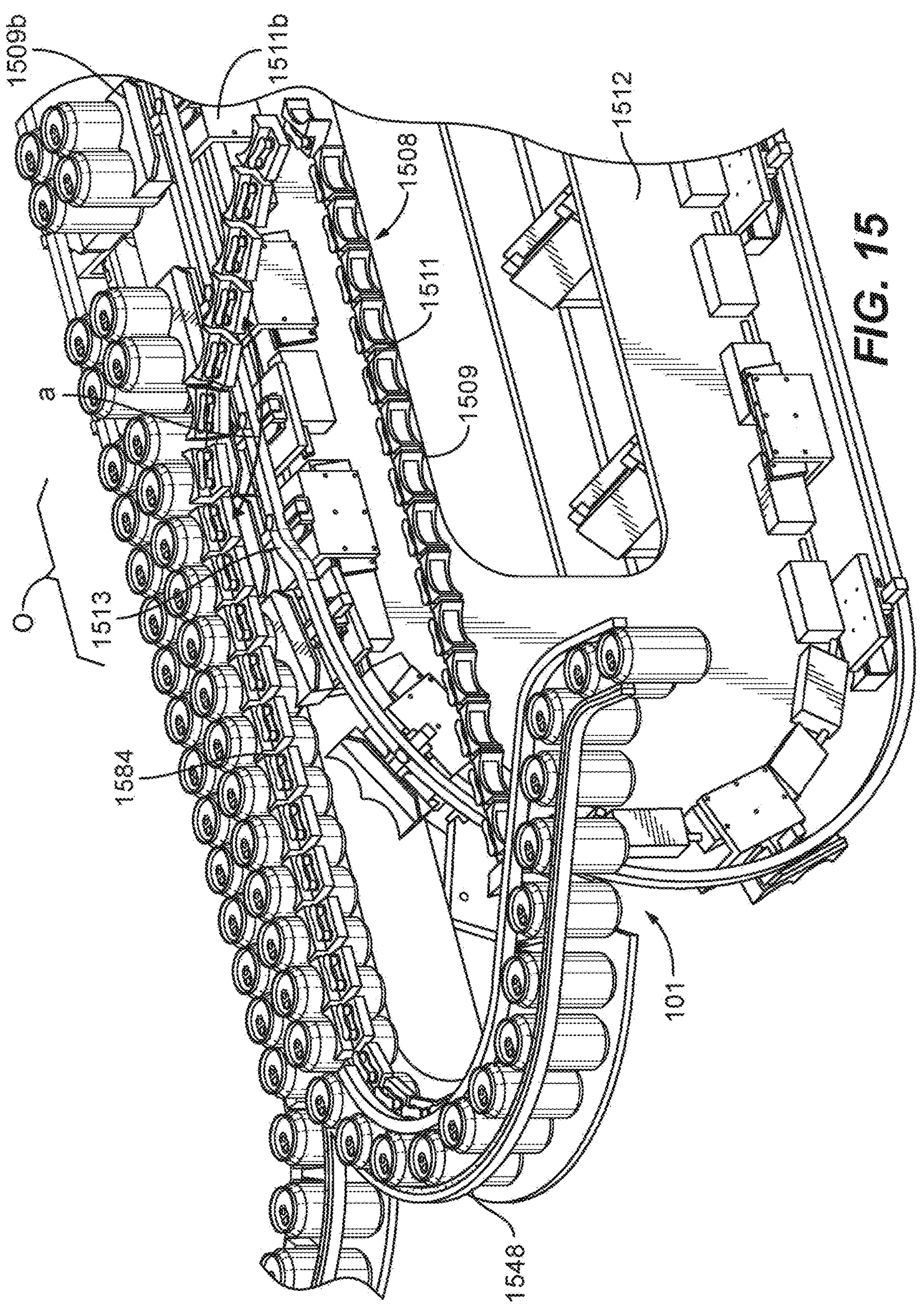
FIG. 15 is a perspective view of the system of FIG. 6, showing interaction of the second track with the first track.

FIG. 14, shows another embodiment wherein the lugs 1411 are each attached and driven by a linear chain 1410, where the lugs 1411 and containers 101 travel at a constant velocity around the track 1408. This embodiments conveys the stream of containers 101 to a downstream packaging station or to second set of lugs 1411 and grippers 1409 that would produce the groups of containers 101. FIG. 15 shows yet another embodiment of the track 1508 where the track 1508 is horizontal but not strictly oval in shape. The track 1508 is skewed at one point at location "a" The oblong shape allows for a smoother departure of the grippers 1509 from each of the containers 101, since the turning angle of the grippers 1509 is not as sharp, this decreases the chances of the gripper 1509 shifting the container as it peels away.

Each of the embodiments shown in FIGS. 14 and 15 can be paired with a second track responsible for receiving the containers 101 from the linear chain and grouping them, again while not disturbing and disorienting the containers 101. The grouping modules 106 in these embodiments include a second track 1512 to move a second plurality of lugs 1511*b* and a second plurality of grippers 1509*b* after receiving containers 101 from the first track. The second set of grippers 1509*b* group the containers 101 into packs, and move the packs along also without changing an orientation of the each container. While, the first plurality of grippers 1509 and the first plurality of lugs 1511 move about the horizontal plane, the second plurality of grippers 1509 and the second plurality of lugs 1511 are move about a vertical plane. Further, the second track 1512 follows an oval but includes a horizontal protuberance 1513 which forces each lug and attached gripper 1509*b* towards the container 101. The second track 1512 can include a linear motor servo drive to actuate each of the lugs 1511*b* along the second track 1512. The lugs 1511*b* and grippers 1509*b* of the second track, are positioned below the grippers 1509 and lugs 1511 of the first track when both sets contact the container 101. This allows the system 100 to handle taller containers 101.

Further seen in FIGS. 15 and 14, the first track 1508 and the second track 1512 partially overlap each other in the area indicated in FIG. 15 by reference the letter "o" and are partially aligned in the same direction, such that the grippers 1509 of the first track and the grippers 1509*b* of the second track contact the container 101 at the same time for a period of time in the area "o" as track 1208 hands the containers 101 of the second track 1212 The overlap of the tracks also allows for a more compact floor space arrangement because two vertical or two horizontal tracks would not be able to overlap without having to move the container vertically. During handing off, the container 101 from the first set of gripper 1509 to the second set of gripper 1509 the container 101 are simultaneously driven by the container 101 of stream of containers 101 by a gripper 1509 of a second plurality of grippers 1509 along the straight path of the first track. The grippers 1509 of the first plurality of grippers 1509 are withdrawn as they peel away from contacting the container 101 of the stream of containers 101.

The gripper 1509 of the first plurality of grippers 1509 and the gripper 1509 of the second plurality of grippers 1509 drive the respective container 101 at the same velocity when both are in contact with the container. This arrangement allows for a smooth transition from the containers 101 being pushed along by the first set of lugs 1511 and grippers 1509 to later the containers 101 being pushed along by the second set of grippers 1509. Also seen in the previously discussed Figures, as the lugs 1511 follow a track, and are connected to corresponding gripper bodies 144, a curved guide 1448 is placed at the location where the grippers 1509 pick up the containers 101 from the orienting module 1504 and follows the track to the first straight section. The guide 1448 helps bias the containers 101 against the gripper bodies.

Figure 16:
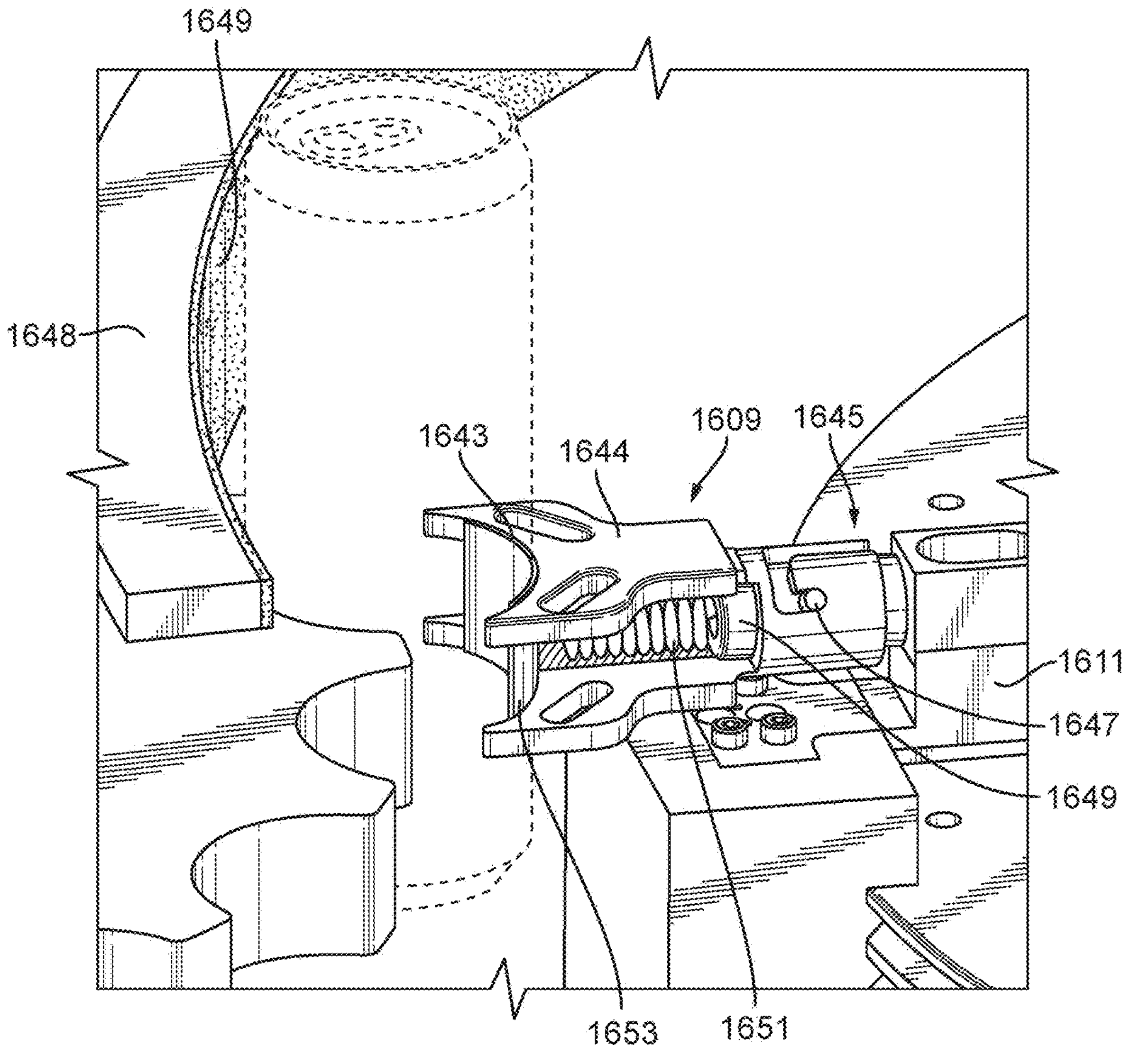
FIG. 16 is a perspective view of a gripper of the system of FIG. 1.

FIG. 16 shows a partial cut away view of the gripper 1609 used by grouping station in the embodiments described above. Each gripper 1609 includes a gripper body 1644, which partially surrounds and drives a corresponding container 101 along the track. Each gripper body 1644 includes a receiving end 1643 and a locking end 1645. Each gripper body 1643 is coupled by the locking end 1645 to the lug 1611. The coupling 1645 which is located on the locking end 1645 of each gripper body 142 is a bayonet style lock. This coupling style allows for an easy changeover of the gripper 1609 depending on the size and shape of the container. Each lug 1611 includes a horizontally extended shaft 1649 configured to connect to the coupling of the gripper body 1643. FIG. 16 further shows a dampener 1651 positioned within each gripper body 142. The dampener 1651, e.g. a spring, dash pot, cushion, or the like, allows for smoothly reacting to a container 101 that is out of place and also acts as a shock absorber in order to not damage the container 101 when coming into contact with the container. An insert 1653 can be placed in the convex portion of the gripper body such that when it comes in contact with the container 101 it helps keep the container 101 oriented in the proper position. The insert 1653 includes material having a higher coefficient of friction than the gripper body 1644. The insert 1653 can be an adhesive strip, such as fugitive glue. The insert 1653 also has a higher coefficient of friction than a contact surface of the guide described above. This combination of friction coefficients allows the gripper to slide the container 101 along the guide without the container 101 changing an orientation or slipping from the gripper, especially along the curved portion of the track where the lug and gripper are accelerating. As the gripper '1609 and container 101 move past the guide, the insert 1653 helps maintain the orientation of the container. This type of adhesive allows the gripper to keep the container 101 from rotating, but also allows the gripper to peel away at the necessary stage without affecting the orientation of the container.

Figure 17:
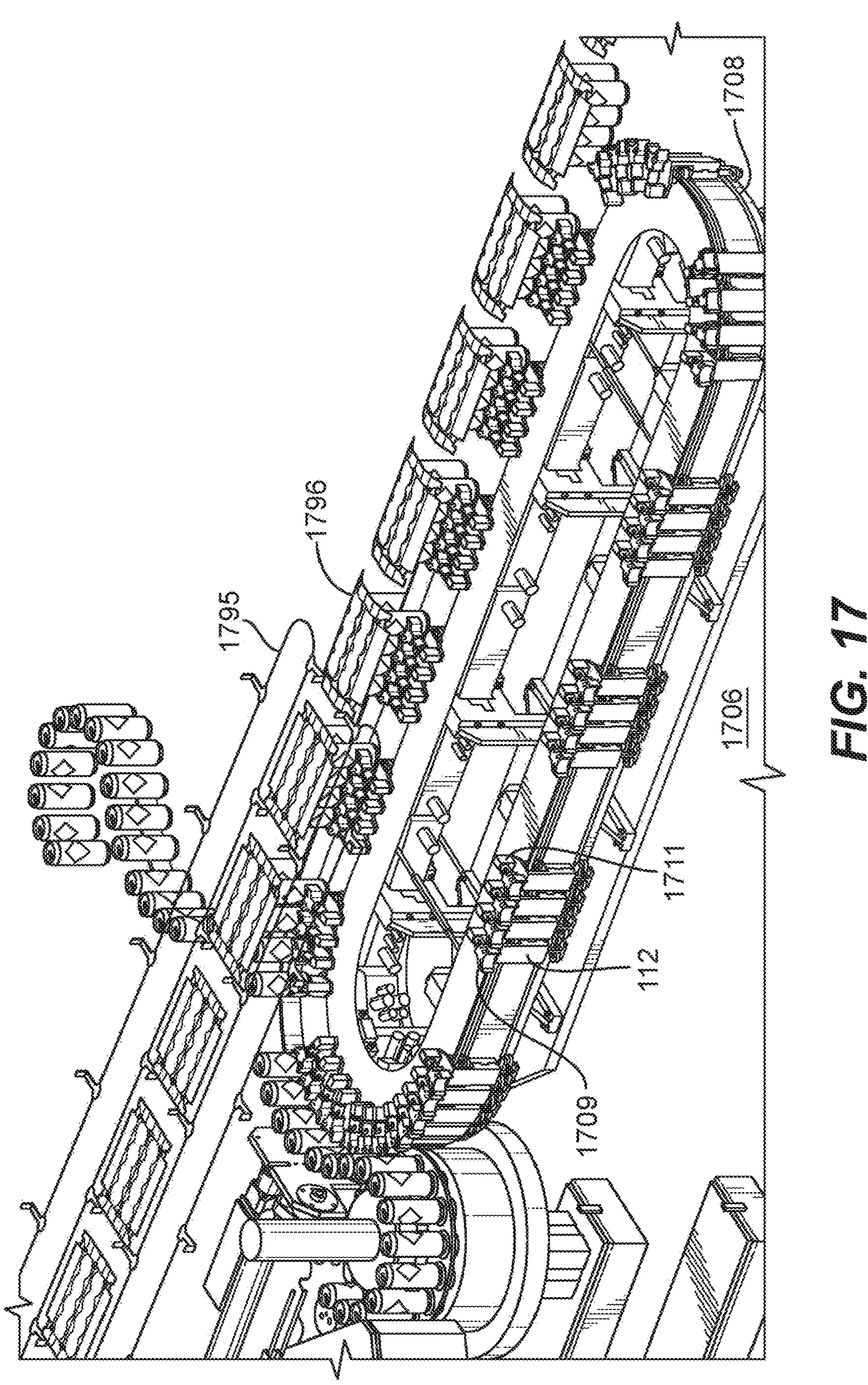
FIG. 17 is a perspective view of a system of FIG. 1, showing a possible placement of a packing apparatus.

FIG. 17, shows how an embodiment previously shown in FIGS. 1, 2, and 7 can be used in conjunction with a packaging apparatus 1795. The packaging apparatus 1795 partially overlaps with the track 1708 and is able to overlay packaging 1796, whether it is cardboard as shown or plastic wrap, while the grippers 1709 are still in contact with the containers 101. This arrangement further ensures that containers keep their intended orientation all the way through the packaging process.

The methods and systems of the present disclosure, as described above and shown in the drawings, provide for a packaging system with superior properties. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A system for conveying and orienting articles to be packaged, the system comprising:

a first conveyor module configured to convey a stream of the articles;

an orientation module configured to receive the stream of articles from the first conveyor module and to orient at least one of the articles in a predetermined orientation to be facing a desired direction; and an article conveyance module configured to receive articles from the orientation module and move the articles to be packaged with multiple articles together, at least one of which has been positioned into, and remains in, the predetermined orientation to be facing the desired direction, wherein the orientation module comprises:

a base configured to support at least one of the articles, a scanning device positioned to scan at least one of the articles, a processor operatively connected to the scanning device configured to analyze an incoming orientation determined based on the scan of at least one of the articles by the scanning device and to compute a necessary correction to achieve the predetermined orientation, and a turning member positioned above the base configured to engage with and turn a corresponding article to be oriented based on a signal from the processor to rotate the corresponding article by the necessary correction into the predetermined orientation, wherein the base and the turning member are operatively configured for relative vertical movement between the base and the turning member to bring the turning member into contact with an upper portion of the corresponding article to be oriented.

2. The system of claim 1, wherein at least a portion of the base is positioned adjacent to a conveyance track of the article conveyance module.

3. The system of claim 1, wherein the turning member includes a disc configured to contact a top surface of the corresponding article when the turning member actuates from a retracted position to a deployed position.

4. The system of claim 3, wherein the disc is deformable.

5. The system of claim 3, wherein the retracted position is above the deployed position with respect to gravity.

6. The system of claim 1, wherein the turning member comprises a plurality of turning members, each having a corresponding motor configured to rotate each turning member independently.

7. The system of claim 1, wherein the camera is stationary with respect to the base.

8. The system of claim 1, wherein at least one of the base and the turning member is rotatably positioned with respect to the camera.

9. A conveyance and orientation module comprising:

a base configured to support at least one container;

a camera positioned to scan a container to be oriented;

a processor operatively connected to the camera configured to analyze an initial orientation of the container based on the scan of the camera and determine a secondary orientation of the container;

a turning member positioned above the base configured to turn the container according to a command from the processor to rotate the container to the secondary orientation; and a star wheel positioned above the base and configured to guide the at least one container, wherein the star wheel is interchangeable with a replacement star wheel configured to guide at least one alternately sized container that has a maximum diameter or width that is different than a maximum diameter or width of the at least one container.

10. The conveyance and orientation module of claim 9, wherein the at least one container is a stream of containers.

11. The conveyance and orientation module of claim 9, wherein the base comprises a surface configured to receive a corresponding container and rotate the container.

12. The conveyance and orientation module of claim 11, wherein each surface comprises a rotatable disk.

13. The conveyance and orientation module of claim 12, wherein the rotatable disk comprises an upper surface flush with an upper surface of the base.

14. An orientation module for receiving and orienting articles to be conveyed and packaged, the orientation module comprising:

a base configured to support at least one article;

a scanning device positioned to scan the at least one article;

a processor operatively connected to the scanning device configured to analyze an incoming orientation determined based on the scan of the at least one article by the scanning device and to compute a necessary correction to achieve a predetermined orientation for the article to be facing a desired direction; and a turning member positioned above the base configured to engage with and turn a corresponding article to be oriented based on a signal from the processor to rotate the corresponding article by the necessary correction into the predetermined orientation, wherein the base and the turning member are operatively configured for relative vertical movement between the base and the turning member to bring the turning member into contact with an upper portion of the corresponding article to be oriented.

* * * * *